(No Model.)

D. PRICE.
ANIMAL CLEANING DEVICE.

No. 506,643. Patented Oct. 10, 1893.

WITNESSES

INVENTOR
Daniel Price
by E. W. Anderson
his Attorney

UNITED STATES PATENT OFFICE.

DANIEL PRICE, OF PROVIDENCE, RHODE ISLAND, ASSIGNOR OF ONE-HALF TO PETER CONNOLLY, OF SAME PLACE.

ANIMAL-CLEANING DEVICE.

SPECIFICATION forming part of Letters Patent No. 506,643, dated October 10, 1893.

Application filed June 30, 1893. Serial No. 479,245. (No model.)

*To all whom it may concern:*

Be it known that I, DANIEL PRICE, a subject of the Queen of Great Britain, and a resident of Providence, in the county of Providence and State of Rhode Island, have invented certain new and useful Improvements in Animal-Cleaning Devices; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
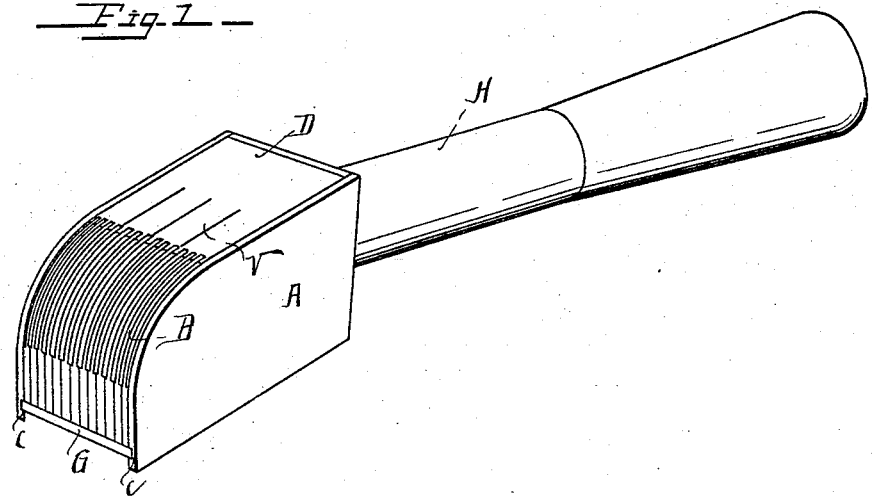
Figure 2:
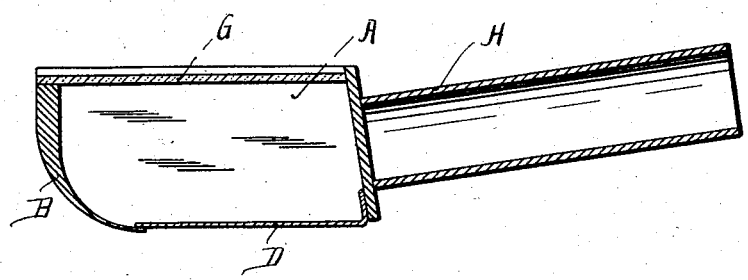

Figure 1 of the drawings is a perspective view and Fig. 2 is a vertical longitudinal section.

This invention has relation to certain new and useful improvements in devices for combing and cleaning animals, the object being to provide a simple and convenient device having, in connection with a comb, a trap for fleas and other vermin; and the invention consists in the novel construction and combination of parts all as hereinafter described and pointed out in the claims.

Referring to the accompanying drawings, the letter A indicates a small case or box, in the lower forward portion of which is a comb B. The box shown is designed to be formed of metal, and the comb B is formed by cutting teeth in the rounded or convex forward end wall C, said comb forming a part of the end and bottom portion of said box or case, the teeth being curved downwardly and rearwardly, and lying in close relation to each other.

D is the bottom plate proper of the box or case, said plate being secured at its rear portion between the lower rear portions of the side walls A'. This plate D is of thin spring metal, and its forward end is held by its inherent spring action against the inner, end portions of the comb teeth. The forward portion of said plate is slitted to form a series of spring fingers V, which will readily yield when the device is being used.

The top portion of the box or case preferably consists of a glass slide G through which the interior may be observed and which may be removed. Said slide is held, and works in, grooves or guides c in the upper inner portions of the side walls A'.

H designates a suitable handle which is secured to the rear end portion of the box or case, said handle projecting obliquely upward for the more convenient operation of the device.

The device is used in the manner of an ordinary comb, the yielding bottom plate D permitting the teeth to be drawn through the hair. The dirt and vermin enter the box, which forms a trap, where they may be observed through the slide G, and from which trap they may be readily removed.

Having described my invention, what I claim, and desire to secure by Letters Patent, is—

1. A combined vermin trap and comb, comprising an inclosing case or box, a comb forming a portion of the wall of said box, and a yielding spring bottom plate acting in connection with said comb and also forming a part of said box, substantially as specified.

2. A combined vermin trap and comb, comprising an inclosing case or box, a comb in the lower front portion of said case or box and forming part of it, a yielding spring bottom plate acting in connection with said comb and forming part of the box, and a handle secured to said box or case, substantially as specified.

3. The herein described device for cleaning animals, comprising a box or case forming a trap, a comb forming the lower forward portion of said box or case, a hinged or pivoted bottom plate of spring metal slitted at its forward portion and forming part of said box, a glass slide forming a part of the top portion of said box or case, and a suitable handle portion, substantially as specified.

In testimony whereof I affix my signature in presence of two witnesses.

DANIEL PRICE.

Witnesses:
GEORGE J. WEST,
PETER CONNOLLY.